United States Patent
Hatoya et al.

(10) Patent No.: US 10,976,081 B2
(45) Date of Patent: Apr. 13, 2021

(54) ABSORPTION CHILLER-HEATER, REPLENISHING LIQUID FOR ABSORPTION CHILLER-HEATER, ABSORPTION LIQUID FOR ABSORPTION CHILLER-HEATER, AND MAINTENANCE METHOD

(71) Applicant: CLEARIZE Co., Ltd., Hitachinaka (JP)

(72) Inventors: Kazuki Hatoya, Ibaraki (JP); Takashi Hishinuma, Ibaraki (JP); Tsunenobu Yokosuka, Ibaraki (JP); Hidenori Inabe, Tokyo (JP); Yoichi Hirata, Tokyo (JP); Hitoshi Yashiro, Iwate (JP)

(73) Assignee: CLEARIZE Co., Ltd., Hitachinaka (JP)

( * ) Notice: Subject to any disclaimer, the term of this patent is extended or adjusted under 35 U.S.C. 154(b) by 0 days.

(21) Appl. No.: 16/421,615

(22) Filed: May 24, 2019

(65) Prior Publication Data
US 2019/0360728 A1    Nov. 28, 2019

(30) Foreign Application Priority Data

May 25, 2018  (JP) .............................. JP2018-100471

(51) Int. Cl.
C09K 5/04    (2006.01)
F25B 15/06   (2006.01)
F25B 29/00   (2006.01)

(52) U.S. Cl.
CPC .............. *F25B 15/06* (2013.01); *C09K 5/047* (2013.01); *F25B 29/006* (2013.01)

(58) Field of Classification Search
CPC ... C10M 2215/02; F25B 15/06; F25B 29/006; C09K 5/047
See application file for complete search history.

(56) References Cited

U.S. PATENT DOCUMENTS 6,155,057 A      12/2000  Angell et al.
2006/0053791 A1*  3/2006  Prentice, III .............. F23G 5/16
                                                      60/645

(Continued)

FOREIGN PATENT DOCUMENTS

| CN | 103540295 | 1/2014 |
| JP | 52-46552 A | 4/1977 |

(Continued)

OTHER PUBLICATIONS

Japanese-language Office Action issued in counterpart Japanese Application No. 2018-100471 dated Sep. 4, 2018 with English translation (seven (7) pages).

*Primary Examiner* — John R Hardee
(74) *Attorney, Agent, or Firm* — Crowell & Moring LLP (57) ABSTRACT

A absorption chiller-heater includes a low temperature regenerator, a high temperature regenerator, a condenser, an evaporator, an absorber, and a heat exchanger, in which water is used as a refrigerant and a lithium bromide aqueous solution is used as an absorption liquid, and the absorption liquid contains a molybdate as a corrosion inhibitor, sodium sulfite or sodium bisulfite as a concentration improving agent, and an octyldimethylethylammonium salt or a lauryldimethylethylammonium salt as a dispersant.

6 Claims, 2 Drawing Sheets

(56) References Cited

U.S. PATENT DOCUMENTS

| | | | |
|---|---|---|---|
| 2012/0011886 A1* | 1/2012 | Shiflett | ............... F25B 15/06 62/476 |
| 2012/0247144 A1 | 10/2012 | Seiler et al. | |
| 2016/0075928 A1 | 3/2016 | Mabuchi et al. | |

FOREIGN PATENT DOCUMENTS

| | | |
|---|---|---|
| JP | 53-18043 A | 2/1978 |
| JP | 53-60751 A | 5/1978 |
| JP | 53-100937 A | 9/1978 |
| JP | 7-174429 A | 7/1995 |
| JP | 7-332813 A | 12/1995 |
| JP | 9-303907 A | 11/1997 |
| JP | 11-287537 A | 10/1999 |
| JP | 2000-351962 A | 12/2000 |
| JP | 3547265 B | 7/2004 |
| JP | 2004-524446 A | 8/2004 |
| JP | 2005-241134 A | 9/2005 |
| JP | 2008-261618 A | 10/2008 |
| JP | 2012-522873 A | 9/2012 |
| JP | 2013-513002 A | 4/2013 |
| JP | 2016-56306 A | 4/2016 |
| JP | 2016-57046 A | 4/2016 |
| WO | WO 02/079543 A2 | 10/2002 |

\* cited by examiner

ABSORPTION CHILLER-HEATER, REPLENISHING LIQUID FOR ABSORPTION CHILLER-HEATER, ABSORPTION LIQUID FOR ABSORPTION CHILLER-HEATER, AND MAINTENANCE METHOD

TECHNICAL FIELD

The present invention relates to techniques for an absorption chiller-heater, a replenishing liquid for an absorption chiller-heater, an absorption liquid for an absorption chiller-heater, and a maintenance method.

BACKGROUND ART

An absorption chiller-heater is an apparatus including an evaporator, an absorber, a regenerator, a condenser, and the like, and is widely put into practical use as an air conditioner for large constructions such as buildings. When water is used as a refrigerant, a concentrated aqueous solution of lithium bromide (concentrated lithium bromide aqueous solution) is suitable as an absorption liquid. Lithium bromide as a main component of the absorption liquid is excellent in hygroscopicity, but has strong corrosion properties. Therefore, lithium bromide causes corrosion of a constituent member of the absorption chiller-heater.

To solve this problem, a method in which a corrosion inhibitor is added to the concentrated lithium bromide aqueous solution is used in the related art. In general, a mixed corrosion inhibitor are used, in which an alkali metal hydroxide such as lithium hydroxide, a nitrate such as lithium nitrate, and a molybdate such as lithium molybdate are combined. The molybdate forms a corrosion protection oxide film, which is a composite film of an iron oxide and a molybdenum oxide, on a surface of carbon steel which is a main constituent material of the absorption chiller-heater. Therefore, in the mixed corrosion inhibitor, the molybdate is excellent in inhibiting both entire corrosion and local corrosion, and contributes to improvement of reliability for corrosion resistance of the absorption chiller-heater.

However, the molybdate has a disadvantage that a solubility in the concentrated lithium bromide aqueous solution (absorption liquid) is small. In addition, the corrosion protection oxide film formed by the molybdate is broken by flow of the absorption liquid or the like, and the molybdate is consumed for forming the corrosion protection oxide film with operation of the absorption chiller-heater since the corrosion protection oxide film is formed again by the molybdate in the broken place. Therefore, a concentration of the molybdate in the absorption liquid decreases over time with operation of the absorption chiller-heater.

For this reason, in order to maintain a sufficient corrosion inhibition effect over a long period, it becomes necessary to control the concentration of the molybdate appropriately and replenish the molybdate regularly, and maintenance becomes complicated. Further, in general, the molybdate is added to the concentrated lithium bromide aqueous solution (absorption liquid) in an amount corresponding to or slightly exceeding the solubility. However, when the molybdate having a concentration considerably exceeding the solubility is added to the concentrated lithium bromide aqueous solution, precipitation occurs. Therefore, there occurs a problem that the operation of the absorption chiller-heater is interrupted. That is, although the corrosion inhibition effect can be obtained by the molybdate, a charging amount of the molybdate is limited.

Therefore, it has been proposed so far to use an additive (high concentration agent) that increases a concentration of the molybdate in the concentrated lithium bromide aqueous solution (see, for example, PTL 1). A charging amount of the molybdate can be increased by charging such a high concentration agent into the concentrated lithium bromide aqueous solution.

PTL 1 discloses a method for delaying corrosion of a metal in contact with a lithium halide aqueous solution "including charging a crystal habit modifier and lithium molybdate into an aqueous solution containing the lithium halide" (see Abstract).

Further, Examples of PTL 1 describes that a concentration of the lithium molybdate is increased to 700 mg/L and a corrosion rate of mild steel ST37, which is an iron-based material, is inhibited to about half of that in the related (reduced from 11.5 mpy to 4.1 mpy) by charging a crystal habit modifier.

PRIOR ART LITERATURE

Patent Literature

PTL 1: JP-A-2004-524446

SUMMARY OF INVENTION

Technical Problem

However, in most cases, a new precipitate (such as the molybdate, the high concentration agent, and a mixture thereof) is produced by adding the high concentration agent.

In addition to the iron-based material, a copper-based material or the like is used in the absorption chiller-heater, and it is necessary to avoid a substance of concern about influence to copper or the like.

The invention has been made in view of such a background, and an object of the invention is to provide an absorption chiller-heater for which maintenance work is little, a replenishing liquid for an absorption chiller-heater for maintenance of the absorption chiller-heater, and an absorption liquid for an absorption chiller-heater, and further to provide a method for performing efficient maintenance of an absorption chiller-heater.

Solution to Problem

In order to attain the above object, the invention provides an absorption chiller-heater including a regenerator, a condenser, an evaporator, an absorber, and a heat exchanger, in which water is used as a refrigerant and a lithium bromide aqueous solution is used as an absorption liquid, and the absorption liquid contains a molybdate as a corrosion inhibitor, sodium sulfite or sodium disulfite as a concentration improving agent, and an octyldimethylethylammonium salt or a lauryldimethylethylammonium salt as a dispersant.

Other solutions will be described in embodiments.

Advantageous Effect

According to the invention, an absorption chiller-heater for which maintenance work is little, a replenishing liquid for an absorption chiller-heater for maintenance of the absorption chiller-heater, and an absorption liquid for an absorption chiller-heater can be provided, and a method for performing efficient maintenance of an absorption chiller-heater can be provided.

DESCRIPTION OF EMBODIMENTS

Next, embodiments for implementing the invention (referred to as "embodiments") will be described in detail with reference to the drawings appropriately.

[Absorption Chiller-Heater Z]

Figure 1:
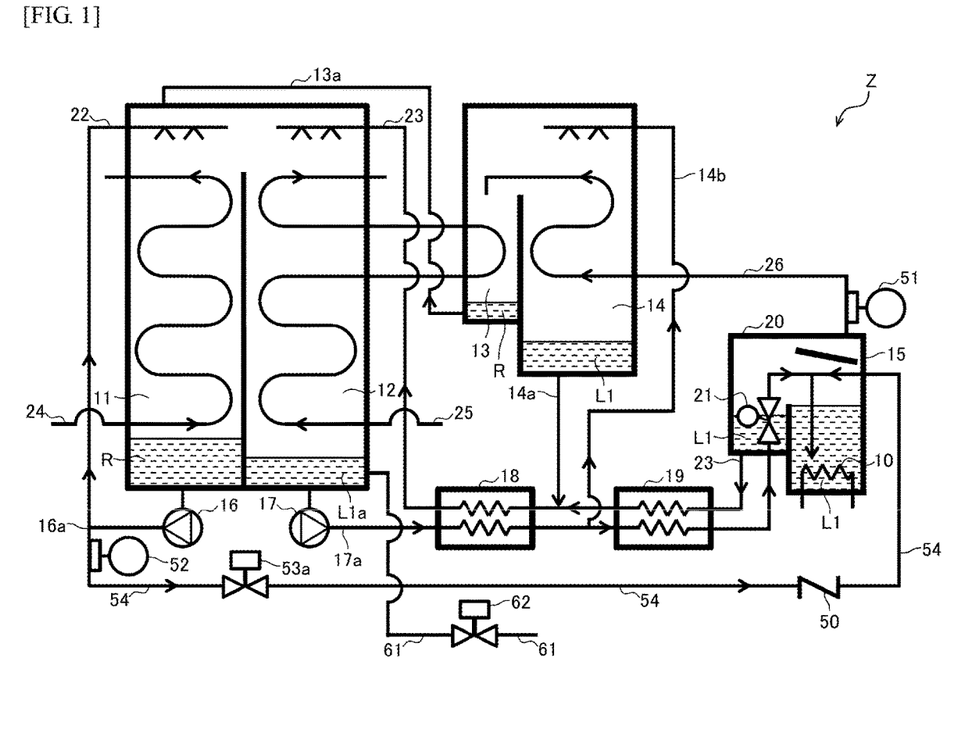
FIG. 1 is a diagram conceptually showing a configuration of an absorption chiller-heater Z according to the present embodiment.

FIG. 1 is a diagram conceptually showing a configuration of an absorption chiller-heater Z according to the present embodiment. The absorption chiller-heater Z shown in FIG. 1 is an example, and other absorption chiller-heaters may be used.

The absorption chiller-heater Z according to the embodiment basically includes an evaporator 11, an absorber 12, a condenser 13, a low temperature regenerator (regenerator) 14, a high temperature regenerator (regenerator) 15, a refrigerant pump 16, a solution circulation pump 17, and a plurality of pipes connecting them. In FIG. 1, a refrigerant R is water.

A cold water heat transfer pipe 24 is arranged in the evaporator 11. Further, one end (water spraying port) of a refrigerant spray pipe 22 is installed at an upper part of the evaporator 11. A pipe on an output side of the refrigerant pump 16 that supplies the refrigerant R in the evaporator 11 to the refrigerant spray pipe 22 is connected to the refrigerant spray pipe 22. A refrigerant pump discharge pressure gauge 52 is connected to a downstream side of a connection part 16a of an output side pipe of the refrigerant pump 16, and a pressure of the refrigerant R discharged from the refrigerant pump 16 can be measured.

The other end of the refrigerant spray pipe 22 is connected to one end of a dilution pipe 54 at the connection part 16a. The other end of the dilution pipe 54 is opened in the high temperature regenerator 15, and the refrigerant R can be supplied into the high temperature regenerator 15. A dilution valve 53a and a check valve 50 are installed on the dilution pipe 54. The dilution valve 53a is disposed on a side of the refrigerant spray pipe 22, and the check valve 50 is disposed on a side of the high temperature regenerator 15.

The absorber 12 is provided adjacent to the evaporator 11, and one end (water spraying port) of a concentrated solution spray pipe 23 is installed at an upper part of the absorber 12. The concentrated solution refers to a concentrated lithium bromide aqueous solution (absorption liquid (absorption liquid for an absorption chiller-heater) L1). Since water, which is the refrigerant R, is separated as water vapor with the start of operation, the absorption liquid L1 is condensed as compared with that when introduced to equipment of the absorption chiller-heater Z. For example, when the lithium bromide concentration of the liquid charged to the equipment of the absorption chiller-heater Z before the operation is 40 to 60%, the concentration rises to about 60% to 80% in the high temperature regenerator 15 (concentrated solution), and rises to 50% to 70% in the absorber 12 (dilute solution) with the start of the operation.

The other end of the concentrated solution spray pipe 23 is connected to a float chamber 20 of the high temperature regenerator 15 via a high temperature heat exchanger 19 and a low temperature heat exchanger 18. On the other hand, a dilute solution pipe 17a returning from the bottom of the absorber 12 to the high temperature regenerator 15 through the float chamber 20 passes through the low temperature heat exchanger 18 and the high temperature heat exchanger 19. Here, the dilute solution refers to a dilute lithium bromide aqueous solution L1a. Heat is exchanged between the dilute solution pipe 17a and the concentrated solution spray pipe 23 in the low temperature heat exchanger 18 and the high temperature heat exchanger 19. Further, a cooling water heat transfer pipe 25 is also arranged in the absorber 12.

A high temperature regenerator vapor pipe 26 from the high temperature regenerator 15 is connected to the low temperature regenerator 14, a high temperature regenerator pressure gauge 51 is installed in the high temperature regenerator vapor pipe 26. A concentrated solution pipe 14a that supplies the concentrated lithium bromide aqueous solution (absorption liquid L1) regenerated at a low temperature from the bottom of the low temperature regenerator 14 is connected to the concentrated solution spray pipe 23 between the high temperature heat exchanger 19 and the low temperature heat exchanger 18. On the other hand, a dilute solution pipe 14b whose water spraying port is set in the low temperature regenerator 14 is connected to the dilute solution pipe 17a between the high temperature heat exchanger 19 and the low temperature heat exchanger 18. The dilute solution pipe 17a is connected to the float valve 21 in the float chamber 20. The float valve 21 controls opening and closing of the valve in accordance with the liquid level of the concentrated lithium bromide aqueous solution (absorption liquid L1) in the float chamber 20, thus, the amount of liquid in the high temperature regenerator 15 is controlled. The refrigerant R condensed and liquefied by condenser 13 is supplied to the evaporator 11 via a condensate pipe 13a.

In a freezing cycle of the absorption chiller-heater Z configured as described above, the refrigerant (water) R is circulated by the refrigerant pump 16, and is sprayed on a surface of the cold water heat transfer pipe 24 in the evaporator 11. Here, the refrigerant R changes into vapor, and cools the cold water heat transfer pipe 24 by evaporative cooling. The generated refrigerant vapor is sent to the absorber 12, and is absorbed by the concentrated lithium bromide aqueous solution (absorption liquid L1) sprayed on the surface of the cooling water heat transfer pipe 25 in the absorber 12. The dilute lithium bromide aqueous solution L1a having absorbed the refrigerant vapor is sent through the dilute solution pipe 17a via the low temperature heat exchanger 18 by means of the solution circulation pump 17 and a part of The dilute lithium bromide aqueous solution L1a is sent to the low temperature regenerator 14 through the dilute solution pipe 14b, and. The rest of the dilute lithium bromide aqueous solution L1a is sent through the dilute solution pipe 17a to the high temperature regenerator 15 via the high temperature heat exchanger 19.

In the high temperature regenerator 15, the refrigerant vapor (water vapor) is separated using a heat input by vapor or a burning device as a heating source 10. The concentrated lithium bromide aqueous solution (absorption liquid L1) from which the refrigerant vapor is separated is guided from the high temperature regenerator 15 to the concentrated solution spray pipe 23. After that, the concentrated lithium bromide aqueous solution (absorption liquid L1) is heat-exchanged in the high temperature heat exchanger 19 and the low temperature heat exchanger 18, and then sent to and sprayed in the absorber 12. In the low temperature regenerator 14, the dilute lithium bromide aqueous solution L1a separates the refrigerant vapor using refrigerant vapor generated in the high temperature regenerator 15 as a heating source. The concentrated lithium bromide aqueous solution (absorption liquid L1) from which the refrigerant vapor is separated is sent through the concentrated solution pipe 14a to the absorber 12 via the low temperature heat exchanger 18 and the concentrated solution spray pipe 23, and is sprayed in the absorber 12. The refrigerant vapor generated in the low temperature regenerator 14 is sent to the condenser 13 and condensed on the surface of the cooling water heat transfer pipe 25. The condensed refrigerant R is sent to the evaporator 11 as described above.

The absorption liquid L1 in the embodiment is a liquid in which a corrosion inhibitor, a concentration improving agent, and a dispersant are mixed in the concentrated lithium bromide aqueous solution.

The corrosion inhibitor contains a predetermined amount of an alkali metal hydroxide, a predetermined amount of nitrate, and a molybdate. A concentration of the corrosion inhibitor varies according to a concentration rate of the absorption liquid L1, but for example, an amount of the molybdate added is preferably 78 ppm to 520 ppm in a 55% lithium bromide aqueous solution.

The concentration improving agent is a sulfur oxoate having reducing properties and an oxidation number of +5 or less or a sulfonate, and capable of increasing a concentration of the molybdate in the absorption liquid L1. Specifically, the sulfur oxoate having an oxidation number of +5 or less is preferably a sulfite or a bisulfite. In addition, a thiosulfate, a hyposulfite, a dithionite, and the like can be used as the sulfur oxoate having an oxidation number of +5 or less. The sulfonate is preferably dodecylbenzene sulfonate. In addition to this, 1-octane sulfonate, p-toluene sulfonate, 1,2-ethane disulfonate, 1,3-benzene disulfonate, or the like can be used as the sulfonate. An amount of the concentration improving agent added is preferably 380 ppm to 2300 ppm.

The dispersant is a quaternary ammonium salt.

Specifically, an octyldimethylethylammonium salt and a lauryldimethylethylammonium salt are preferable. In addition to this, a tetramethylammonium salt, a lauryltrimethylammonium salt, a cetyltrimethylammonium salt, a stearyltrimethylammonium salt, a behenyltrimethylammonium salt, a phenyltrimethylammonium salt, a benzyltrimethylammonium salt, a cetyldimethylethylammonium salt, a didecyldimethylammonium salt, a dilauryldimethylammonium salt, a dioleyldimethylammonium salt, a di stearyl dimethylammonium salt, a stearyldimethylhydroxyethyl ammonium salt, a benzyldimethyllaurylammonium salt, a benzyldimethylmyristylammonium salt, a trioxyethylenemethylammonium salt, an oleylbishydroxyethylmethylammonium salt, a benzyltriethylammonium salt, a tetrapropylammonium salt, a tetrabutylammonium salt, and a benzyltributylammonium salt can be used as the dispersant. An amount of the dispersant added is preferably 10 ppm to 1200 ppm.

As described above, the molybdate or the concentration improving agent in the absorption liquid L1 can be dispersed by using the quaternary ammonium salt as the dispersant. Accordingly, it is possible to inhibit precipitation of a precipitate originated from the molybdate, the concentration improving agent, and a mixture of the molybdate and the concentration improving agent.

As described above, the concentration of the corrosion inhibitor can be increased by adding the concentration improving agent to the absorption liquid L1. Further, it is possible to inhibit precipitation of a precipitate originated from the molybdate, the concentration improving agent, and a mixture of the molybdate and the concentration improving agent by adding the dispersant to the absorption liquid L1.

In the embodiment, a connection point of the dilution pipe 54 to the high temperature regenerator 15 via which the refrigerant R or the dilute lithium bromide solution L1a flows into the high temperature regenerator 15 is a pipe connected from the check valve 50 to the inside of the high temperature regenerator 15. However, the refrigerant R or the dilute lithium bromide solution L1a may be directly charged into a liquid layer part inside the high temperature regenerator 15, or the high temperature regenerator vapor pipe 26 which is a gas layer part may be used as the connection point. The check valve 50 is not essential in the embodiment, but is provided as a safety device in the case of a control failure.

As described above, in the absorption chiller-heater Z, the dilution pipe 54 is branched from the refrigerant spray pipe 22, and the refrigerant pump discharge pressure gauge 52 and the dilution valve 53a are installed in the middle of the dilution pipe 54. A high temperature regenerator pressure gauge 51 is provided in the high temperature regenerator vapor pipe 26 extending from the high temperature regenerator 15 to the low temperature regenerator 14.

Further, as shown in FIG. 1, the absorber 12 includes a sampling pipe (charging unit) 61 for obtaining and analyzing the dilute lithium bromide aqueous solution L1a. The sampling pipe 61 includes a valve 62.

Figure 2:
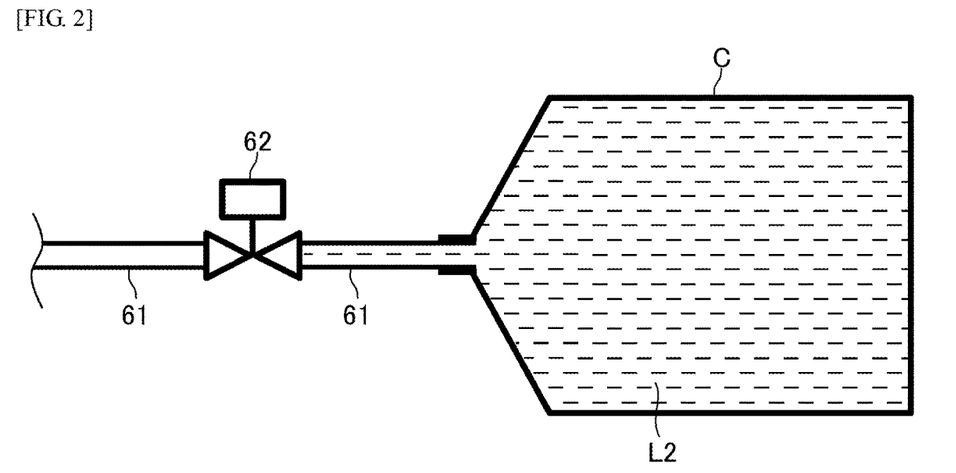
FIG. 2 is a diagram showing a charging method of a replenishing liquid L2.

Addition of the corrosion inhibitor, the concentration improving agent, and the dispersant (replenishing liquid (replenishing liquid for absorption chiller-heater) L2 (refer to FIG. 2)) to the equipment may be performed such that each component is added separately, or by adding the replenishing liquid L2 mixed in a specific ratio in advance. As shown in FIG. 2, an operator connects a container C (see FIG. 2) to the sampling pipe 61, and the valve 62 is opened during the operation of the absorption chiller-heater Z or during a long-term stop of the absorption chiller-heater Z at the time of switching cooling and heating. Then, a replenishing liquid L2 in the container C is inhaled into the absorber 12 (see FIG. 1) via the sampling pipe 61. This is because the inside of the absorber 12 is a vacuum during the operation of the absorption chiller-heater Z or during a long-term stop of the absorption chiller-heater Z at the time of switching cooling and heating. The container C having flexibility is entirely filled with the replenishing liquid L2 and contains no gas therein. Since the container C collapse with the inhalation, the replenishing liquid L2 can be introduced into the absorption chiller-heater Z without taking in air. Accordingly, the vacuum state inside the absorber 12 can be maintained. However, when the container C is connected to the sampling pipe 61, a trace amount of air or dissolved oxygen in the replenishing liquid L2 may be introduced into the absorption chiller-heater Z. Even in such a case, the air or dissolved oxygen thus introduced is discharged from an air extraction line (not shown).

In the newly installed absorption chiller-heater Z, the inside is not vacuum. Therefore, the absorption liquid L1 is charged into the inside of the absorption chiller-heater Z by a method different from that using the sampling pipe 61, and then a work of evacuating the inside is performed.

Here, the replenishing liquid L2 enclosed in the container C is an aqueous solution of the corrosion inhibitor, the concentration improving agent, and the dispersant mixed at a specific ratio in advance. Substances (corrosion inhibitor, concentration improving agent, dispersant) contained in the replenishing liquid L2 are the same as those in the absorption liquid L1. That is, the replenishing liquid L2 contains a molybdate as the corrosion inhibitor, a sulfur oxoate having an oxidation number of +5 or less or a sulfonate as the concentration improving agent, and a second ammonium salt as the dispersant. The sulfur oxoate having an oxidation number of +5 or less is at least one of a sulfite and a bisulfate. Since specific substances of the dispersant are the same as those of the absorption liquid L1, description thereof is omitted here.

Such a replenishing liquid L2 is prepared by specifying a ratio of the components considering the components of the absorption liquid L1 of the absorption chiller-heater Z before addition. Solubility in water of the molybdate not containing lithium bromide is high, and the replenishing liquid L2 can be a solution denser than the absorption liquid L1. Therefore, it is possible to reduce an additional amount charged to the absorption chiller-heater Z and to reduce a maintenance cost such as transportation and storage by using the concentrated replenishing liquid L2. For example, considering the dilution by the addition of the replenishing liquid L2 to the absorption liquid L1, the concentration of the aqueous solution can be increased to about 5 to 100 times the target composition.

In general, when the absorption chiller-heater has not been operated or an entire amount of the concentrated lithium bromide aqueous solution (absorption liquid L1) is replaced, the concentrated lithium bromide aqueous solution is charged into the inside of the absorption chiller-heater Z whose operation is stopped.

On the other hand, in the embodiment, when the corrosion inhibitor, the concentration improving agent, and the dispersant are to be additionally charged while the absorption chiller-heater Z is operating, the replenishing liquid L2 is inhaled into the absorber 12. This makes it possible to additionally charge the corrosion inhibitor, the concentration improving agent, and the dispersant without stopping the operation of the absorption chiller-heater Z.

In general, when the absorption chiller-heater Z stops for a long period, solubility of the molybdate decreases as temperature of the absorption liquid L1 decreases. That is, a possibility of precipitation of a precipitate containing a molybdate or the like is larger than that during operation. In such a case, during operation or stop of the absorption chiller-heater Z, the replenishing liquid L2 containing the dispersant is inhaled into the absorber 12 to thereby inhibit precipitation of the precipitate containing a molybdate or the like.

When the absorption liquid components of the absorption chiller-heater Z are changed in order to add, for example, an additive, an old liquid is replaced by a new liquid to which the additive is added by replacing an entire amount of the concentrated lithium bromide aqueous solution (absorption liquid L1) so far. When the entire amount of the concentrated lithium bromide aqueous solution is replaced, the replacement is performed in a flow of (X1) stop of the absorption chiller-heater Z, (X2) removal of the old liquid, (X3) charging of the new liquid, (X4) adjustment, and (X5) start of operation, the whole of which takes about 4 to 6 days. In addition, most of labor and expense required when the entire amount of the concentrated lithium bromide aqueous solution is replaced depend on the concentrated lithium bromide aqueous solution itself. In the embodiment, since it is not necessary to replace the entire amount, there is only cost required when the corrosion inhibitor, the concentration improving agent, and the dispersant are additionally replenished, and the overall cost can be considerably reduced.

In general, as operation time of the absorption chiller-heater Z passes, it is necessary to additionally replenish the molybdate since the molybdate decreases. In an addition method of the replenishing liquid L2 according to the embodiment, the absorption chiller-heater Z is not stopped and the absorption liquid L1 is not entirely replaced, and the replenishing liquid L2 can be additionally replenished by simply connecting the container C to the sampling pipe 61. As a result, not only considerable reduction in time required for addition of the corrosion inhibitor, the concentration improving agent, and the dispersant, but the number of procedures can be considerably reduced. In addition, frequency of additionally replenishing the molybdate can be considerably reduced compared with the related art. Accordingly, a burden on the operator can be considerably reduced. Maintenance cost can also be reduced.

Further, since the sampling pipe 61 originally included in the absorption chiller-heater Z can be used, it is not necessary to replace or modify the equipment.

The time required for charging the replenishing liquid L2 according to the embodiment is about 0.5 h to 1 h. Incidentally, since the concentration improving agent and the dispersant in the replenishing liquid L2 do not decrease over time unlike the molybdate, it is not necessary to charge again in principle if the replenishing liquid L2 is charged once.

Here, addition of the replenishing liquid L2 in the embodiment is desirably performed in the following procedure.

(Y1) A state of the absorption chiller-heater Z is checked.

(Y2) An amount of the molybdate (corrosion inhibitor) in the absorber 12 is confirmed. This is performed using the dilute lithium bromide aqueous solution L1a (see FIG. 1) in the absorber 12 obtained from the sampling pipe 61.

(Y3) An amount of the molybdate to be added is determined based on the amount of the molybdate confirmed in (Y2).

(Y4) It is determined how much replenishing liquid L2 is added based on the amount of the molybdate determined in (Y3).

(Y5) The amount of the replenishing liquid L2 determined in (Y4) is added to the absorber 12. At this time, as described above, the container C is connected to the sampling pipe 61.

(Y6) When it is necessary to adjust a concentration of lithium bromide after adding the replenishing liquid L2, excess water is removed according to the need. The excess water is evacuated from an excess water discharge pipe (not shown) provided on a discharge side of the refrigerant pump 16.

In the large absorption chiller-heater Z, a total amount of the concentrated lithium bromide aqueous solution amounts about 30 t. Replacement of the entire amount of the solution requires a large burden and cost. On the other hand, in the embodiment, since the replenishing liquid L2 containing the corrosion inhibitor, the concentration improving agent, and the dispersant is only introduced into the absorber 12, the burden and cost can be greatly reduced.

Here, it is desirable that the replenishing liquid L2 contains compositions having the following concentration.

Molybdate (corrosion inhibitor): 0.8% to 5.2%

Sulfur oxoate having oxidation number of +5 or less or sulfonate (concentration improving agent): 3.8% to 23%

Quaternary ammonium salt (dispersant): 0.1% to 12%

Until now, for example, when lithium molybdate is adopted as the molybdate, the molybdate can be dissolved only to about 200 ppm, but the molybdate can be dissolved or dispersed to 520 ppm by using the concentration improving agent of the embodiment. Accordingly, an effect of inhibiting corrosion of the absorption chiller-heater Z can be considerably improved.

The corrosion inhibitor, the concentration improving agent, and the dispersant contained in the replenishing liquid L2 in the container C are preferably in a concentrated state such as 100 times of concentration. The concentration is a state in which the concentrations of the corrosion inhibitor, the concentration improving agent, and the dispersant in the absorption chiller-heater Z are higher than those in the absorption liquid L1.

In addition, the absorption liquid L1 is a concentrated lithium bromide aqueous solution in which the molybdate (corrosion inhibitor) contained in the replenishing liquid L2, the sulfur oxoate having an oxidation number of +5 or less, or the sulfonate (concentration improving agent), and the quaternary ammonium salt (dispersant) are dissolved or dispersed.

As described above, the replenishing liquid L2 is enclosed in the container C after each component is prepared in advance. Thereby, when the replenishing liquid L2 is charged in the absorption liquid L1, the corrosion inhibitor, the concentration improving agent, and the dispersant are charged simultaneously. This is because the corrosion inhibitor (in particular, lithium molybdate) may precipitate immediately after the replenishment when the corrosion inhibitor is added alone to the concentrated lithium bromide solution.

Incidentally, the addition (replenishment) of the absorption liquid L1 is not performed in principle. The absorption liquid L1 is added when the absorption liquid L1 decreases due to some trouble as the absorption chiller-heater Z is operating over a long period.

(Experiment)

Figure 3:
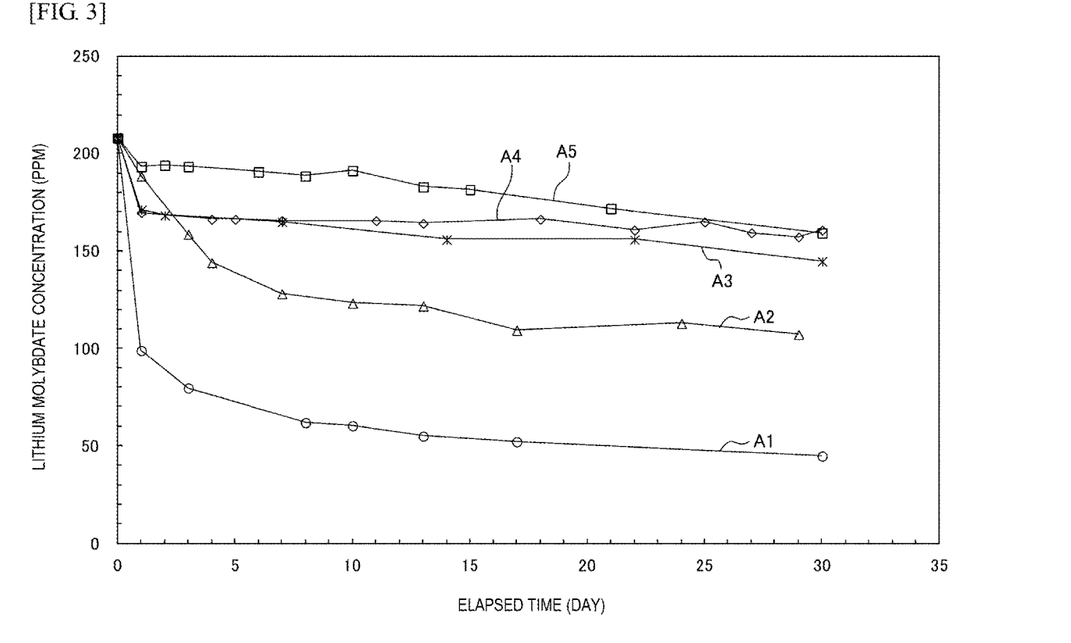
FIG. 3 is a graph showing results of comparing changes over time of a concentration of lithium molybdate in a lithium bromide aqueous solution to which a concentration improving agent of the embodiment is added and a comparative example.

FIG. 3 is a graph showing a result of comparing changes over time of concentrations of lithium molybdate (one of the molybdate) in the concentration improving agent of the embodiment and the absorption liquid L1 in which amino methylene phosphonic acid (referred to as AMP) and 1-hydroxy ethylidene-1,1-diphosphonic acid (referred to as HEDP) which are compounds not corresponding to the concentration improving agent of the embodiment.

In FIG. 3, a horizontal axis shows elapsed time (day), a vertical axis shows a lithium molybdate concentration (ppm) in the aqueous solution.

In addition, an experimenter selected two kinds from the concentration improving agent used in the embodiment, i.e., sodium sulfite and sodium disulfide. Incidentally, it is sufficient that the concentration improving agent contains at least one of sodium sulfite and sodium bisulfate.

In this experiment, first, the experimenter prepared an aqueous solution (concentrated lithium bromide solution) having the following component concentrations as an aqueous solution serving as a base.

Lithium bromide: 60%
Lithium hydroxide: 960 ppm
Lithium molybdate: 210 ppm

Next, the experimenter prepared a solution (solutions A1 to A5) in which each component is added to the aqueous solution at the following concentration.

Solution A1: no addition
Solution A2: AMP: 1200 ppm
Solution A3: HEDP: 820 ppm
Solution A4: sodium sulfite: 500 ppm
Solution A5: sodium disulfite: 760 ppm Here, the solution A1 serves as a control, the solutions A2 and A3 correspond to a concentrated lithium bromide aqueous solution containing a compound to be compared, and the solutions A4 and A5 correspond to a concentrated lithium bromide aqueous solution containing the concentration improving agent of the embodiment. Sodium sulfite and sodium disulfite are the sulfur oxoate having an oxidation number of +5 or less.

The prepared solutions A1 to A5 were enclosed in a polypropylene container immediately after preparation and stored at 40° C. After elapse of a certain time, parts of the solutions A1 to A5 were separated, and the concentrations of lithium molybdate in the aqueous solutions were measured by an absorptiometric method.

Results of the above experiment are shown in the graph of FIG. 3. Reference numerals A1 to A5 in the graph indicate results of the solutions A1 to A5.

In the graph of FIG. 3, the state that a concentration of lithium molybdate decreases with elapse of days indicates that precipitation of a precipitate of lithium molybdate occurs. That is, it is shown that the concentration of lithium molybdate in a supernatant is reduced since lithium molybdate is precipitated.

On the contrary, the state that the concentration of lithium molybdate does not decrease with elapse of days indicates that the precipitation of lithium molybdate does not occur much. That is, it is shown that the concentration of lithium molybdate in a supernatant is not reduced since lithium molybdate is not precipitated.

As shown in FIG. 3, a rate of decrease in the concentration of lithium molybdate in the solutions A1 to A5 during day 0 to day 1 was large as compared with the subsequent period. This is considered to be affected by incomplete dissolution of the additives at a stage of preparing the solutions A1 to A5.

As shown in FIG. 3, as compared with the solution A1, an effect of maintaining the lithium molybdate concentration for a long period was observed in the solution A3 to which the compound to be compared was added and the solutions A4 and A5 to which the concentration improving agent of the embodiment was added. On the other hand, it was confirmed that the effect of maintaining the lithium molybdate concentration was poor in the solution A2 to which the compound to be compared was added.

As described above, the corrosion inhibitor (molybdate) can be highly concentrated for a long period by adding the concentration improving agent (the sulfur oxoate having an oxidation number of +5 or less, or the sulfonate) to the concentrated lithium bromide aqueous solution. Accordingly, the frequency of the additional replenishment of the corrosion inhibitor can be considerably reduced, and the maintenance cost can be reduced. Further, since a large amount of the corrosion inhibitor can be charged, it is possible to improve reliability by improving corrosion resistance of the absorption chiller-heater Z.

Figure 4:
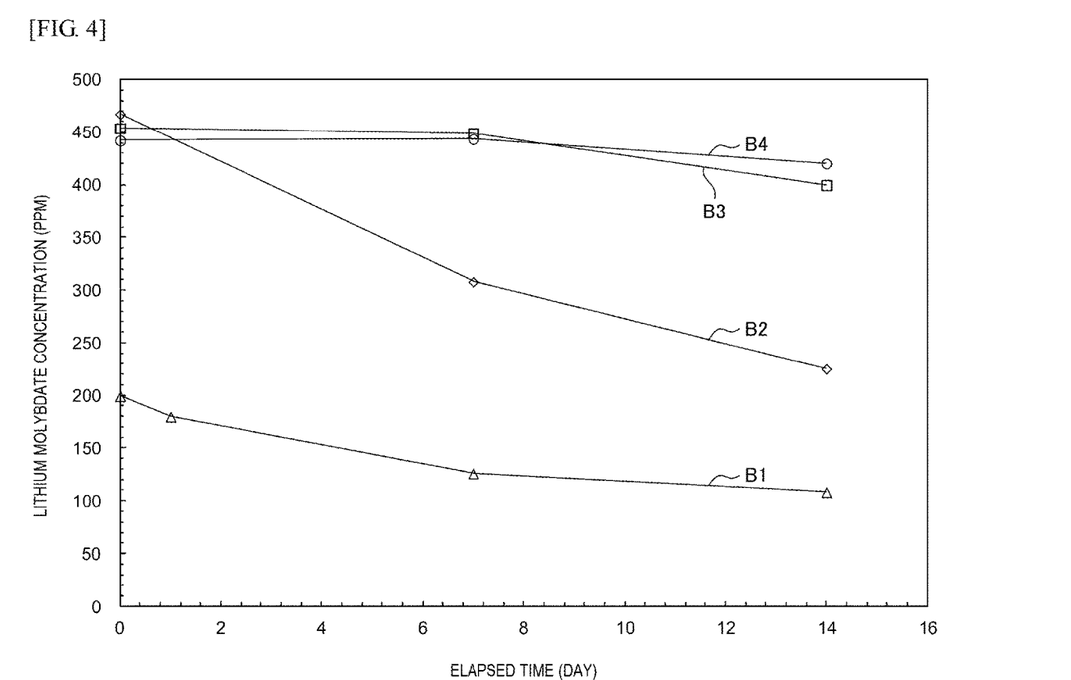
FIG. 4 is a graph showing that the concentration of lithium molybdate is maintained at a high level for a long period by adding the concentration improving agent and a dispersant in combination.

FIG. 4 is a graph showing results of comparing the changes over time of the concentrations of lithium molybdate in a solution in which the corrosion inhibitor (lithium molybdate) is added (solution B1), a solution in which the corrosion inhibitor and the concentration improving agent are added (solution B2), and a solution in which the corrosion inhibitor, the concentration improving agent, and the dispersant are added (solutions B3 and B4) to the concentrated lithium bromide aqueous solution (absorption liquid L1). This experiment was performed to examine the effect of inhibiting precipitation of the corrosion inhibitor by adding the concentration improving agent and the dispersant in combination with the concentrated lithium bromide aqueous solution.

In FIG. 4, a horizontal axis shows elapsed time (day), a vertical axis shows a concentration (ppm) of lithium molybdate in the concentrated lithium bromide aqueous solution.

In this experiment, a 55% lithium bromide aqueous solution is used as a main component, and a solution containing 520 ppm of lithium molybdate (corrosion inhibitor) is used as the solution B1. A solution in which 630 ppm of sodium sulfite (the concentration improving agent of the embodiment) is added to the solution B1 is used as the solution B2.

Further, a solution in which 100 ppm of octyldimethylethylammonium ethyl sulfate (the dispersant of the embodiment) is added to the solution B2 is used as the solution B3.

In addition, a solution in which 100 ppm of lauryldimethylethylammonium ethyl sulfate (dispersant of the embodiment) is added to the solution B2 is used as the solution B4.

To these solutions, 0.1% to 0.5% of lithium hydroxide was appropriately added for the purpose such as pH adjustment.

The prepared solutions B1 to B4 were left to stand at room temperature (about 23° C.) in an atmosphere open state. After elapse of a certain time, parts of the solutions B1 to B4 were separated, and the concentrations of lithium molybdate in the aqueous solutions were measured by a high-frequency inductively coupled plasma emission spectrometric method.

The results of the experiment are shown in the graph of FIG. 4. Reference numerals B1 to B4 in the graph indicate results of the solutions B1 to B4. From FIG. 4, in the solution B2 in which sodium sulfite (concentration improving agent) was added, a higher concentration of lithium molybdate (corrosion inhibitor) was maintained as compared with the solution B1. From this, it is understood that the corrosion inhibitor in the concentrated lithium bromide aqueous solution is highly concentrated by adding the concentration improving agent of the embodiment.

In addition, a lithium molybdate concentration higher than that of the solution B2 was maintained in the solution B3 to which sodium sulfite and octyldimethylethylammonium ethyl sulfate (dispersant) are added and the solution B4 to which sodium sulfite and lauryl dimethylethylammonium ethyl sulfate (dispersant) are added. From this, it is understood that by adding the dispersant to the concentration improving agent, even though lithium molybdate in the concentrated lithium bromide aqueous solution is beyond solubility and precipitated, lithium molybdate is maintained in the solution (supernatant) in a dispersed state by an effect of the dispersant over a longer period, that is, the precipitation is inhibited from occurring.

Thus, the absorption liquid L1 (and the replenishing liquid L2) containing the concentration improving agent and the dispersant can stably maintain the corrosion inhibitor in the concentrated lithium bromide aqueous solution over a long period by an effect of increasing a concentration of the corrosion inhibitor of the concentration improving agent and an effect of inhibiting precipitation of the precipitate containing the corrosion inhibitor of the dispersant.

(Corrosion Influence on Carbon Steel and Copper)

Table 1 to be described later is a table comparing a corrosion influence on carbon steel and copper in the concentration improving agent of the embodiment and other compounds.

The carbon steel and copper are main constituent materials of the absorption chiller-heater Z.

In this experiment, first, an aqueous solution having the following component concentrations was prepared as an aqueous solution serving as a base.

Lithium bromide: 65%
Lithium hydroxide: 0.1% to 0.5%
Lithium molybdate: 520 ppm

Next, a solution (solutions C1 and C2) in which each component was dissolved to the aqueous solution at the following concentration was prepared.

Solution C1: HEDP (another compound): 2100 ppm
Solution C2: sodium bisulfate (concentration improving agent of the embodiment): 1900 ppm Next, each of the solution C1 and the solution C2 was charged into two glass containers (four in total) equipped with a cooling pipe thereon. Subsequently, a test piece (50×10×2 mm) of carbon steel (SS400) was placed in one of the two glass containers each, and a test piece (50×10×2 mm) of copper (C1220) was placed in the remaining one.

Then, after the placement, heating was performed with a hot plate so that the solution temperature becomes 160° C., and a deaeration treatment was performed by constantly bubbling with argon gas in order to remove an influence of dissolved oxygen. A corrosion amount (mg/dm$^2$) of the test piece was calculated from a weight difference between each of the test pieces of carbon steel and copper before and after the test. Test time was 100 h. That is, it is shown that the corrosion proceeds as the corrosion amount increases.

Results of the test are shown in Table 1.

TABLE 1

| | LiBr | Li$_2$MoO$_4$ | Concentration improving agent | Immersion conditions | Carbon steel test piece Corrosion amount mg/dm$^2$ | Copper Test piece Corrosion amount mg/dm$^2$ |
|---|---|---|---|---|---|---|
| Solution C1 | 65% | 520 ppm | HEDP: 2100 ppm | 100 h/ 160° C. | 69 | 148 |
| Solution C2 | 65% | 520 ppm | Sodium disulfite: 1900 ppm | | 42 | 17 |

In Table 1, the corrosion amounts of the test pieces of carbon steel and copper immersed in the solutions C1 and C2 are shown. From Table 1, the corrosion amounts of the carbon steel test pieces immersed in the solution C1 and the solution C2 became approximately the same. Thus, a corrosion inhibition effect on the carbon steel is considered to be approximately the same in the solutions C1 and C2 to which HEDP and sodium bisulfate are added.

On the other hand, when the corrosion amounts of the copper test pieces immersed in the solutions C1 and C2 were compared, the corrosion amount in the solution C2 (the embodiment) was considerably smaller than the corrosion amount in the solution C1. Thus, a high corrosion inhibition effect on copper is obtained by adding sodium disulfite, which is one of the concentration improving agents of the embodiment. In addition, the same effect was obtained in sodium sulfite.

In Table 2 to be described later, a corrosion inhibition effect is evaluated when the concentration improving agent and the dispersant are added in combination to the concentrated lithium bromide aqueous solution.

First, a 55% lithium bromide aqueous solution is used as a main component, lithium hydroxide is contained in a range of 0.1% to 0.5%, and further, a solution containing 200 ppm of lithium molybdate as one of the molybdate, which is the corrosion inhibitor, is used as a solution D1. Here, a concentration of lithium molybdate added is a concentration considered to be near an upper limit of a range that can be added in the existing technology. Lithium molybdate is added to the solution D1, a concentration is set to 520 ppm, and a solution to which the following additives are added is used as a solution D2.

Sodium sulfite: 630 ppm (one of the sulfite, concentration improving agent of the embodiment)

Octyldimethylethylammonium ethyl sulfate: 100 ppm (one of the octyldimethylethylammonium salt: dispersant of the embodiment)

That is, the solution D1 is a comparative example, and is a concentrated lithium bromide aqueous solution containing a corrosion inhibitor but not containing the concentration improving agent and the dispersant. The solution D2 is the absorption liquid L1 of the embodiment containing the corrosion inhibitor, the concentration improving agent, and the dispersant.

Next, each of the prepared solutions D1 and D2 was charged in a glass container with a cooling pipe installed thereon. Then, a test piece (50×10×2 mm) of carbon steel (SS400) and a test piece (50×10×2 mm) of copper (C1220) were placed in each glass container.

After the placement of each test piece, heating was performed with a hot plate so that temperatures of the solutions D1 and D2 become 100° C. In addition, in order to simulate a situation in which air leakage occurs in a real absorption chiller-heater Z (real machine), bubbling by 300 ppm of oxygen gas (balance with nitrogen gas) was constantly performed to evaluate an influence of corrosion. Corrosion amounts ($mg/dm^2$) of the test pieces were calculated from weight differences between the test pieces of carbon steel and copper before and after the test. Here, increase in the corrosion amount means that the corrosion proceeds. Test time was 1000 h, and reliability against corrosion by a long time test was evaluated.

Results of the above experiment are shown in Table 2. That is, table 2 shows the corrosion amounts of the test pieces of carbon steel and copper in an environment simulating air leakage of the real machine.

As shown in Table 2, in both carbon steel and copper, a corrosion amount of the solution D2 (absorption liquid L1 according to the embodiment) to which the concentration improving agent and the dispersant are added in addition to the corrosion inhibitor can be considerably reduced by the solution D1 which is a concentrated lithium bromide aqueous solution which has been used so far.

Thus, by addition of the sulfur oxoate having an oxidation number of +5 or less or the sulfonate (concentration improving agent) and the quaternary ammonium salt (dispersant) in combination, it was confirmed that reliability against corrosion for a long period was ensured in addition to an effect of maintaining lithium molybdate in the absorption liquid L1 stably over a long period.

The invention is not limited to the above-described embodiments, and includes various modifications. For example, the above-described embodiments have been described in detail for easy understanding and description of the invention, and are not necessarily limited to those having all the described configurations.

In the embodiment, only control lines and information lines considered to be necessary are illustrated in the description, and not all the control lines and information lines on the product are necessarily illustrated. In practice, almost all configurations may be considered to be connected to one another.

REFERENCE SIGN LIST

11 Evaporator
12 Absorber
13 Condenser
14 Low temperature regenerator (Regenerator)
15 High temperature regenerator (Regenerator)
61 Sampling pipe (Charging unit)
L1 Absorption liquid (Absorption liquid for absorption chiller-heater)
L2 Replenishing liquid (Replenishing liquid for absorption chiller-heater)

The invention claimed is:

1. An absorption chiller-heater comprising
a regenerator, a condenser, an evaporator, an absorber, and a heat exchanger, wherein
water is used as a refrigerant, and a lithium bromide aqueous solution is used as an absorption liquid, and
the absorption liquid used contains all of:
    200 ppm to 520 ppm of a molybdate as a corrosion inhibitor;
    630 ppm to 2300 ppm of sodium sulfite or sodium bisulfite as a concentration improving agent; and
    100 ppm to 1200 ppm of an octyldimethylethylammonium salt or a lauryldimethylethylammonium salt as a dispersant.

TABLE 2

| | LiBr | Corrosion inhibitor $Li_2MoO_4$ | Concentration improving agent | Dispersant | Immersion conditions | Carbon steel test piece Corrosion amount $mg/dm^2$ | Copper Test piece Corrosion amount $mg/dm^2$ |
|---|---|---|---|---|---|---|---|
| Solution D1 | 55% | 200 ppm | — | — | 1000 h/ 100° C./ $O_2$ 300 ppm | 172 | 378 |
| Solution D2 | 55% | 520 ppm | Sodium sulfite: 630 ppm | Octyl-dimethylethyl-ammonium ethyl sulfate: 100 ppm | | 67 | 206 |

2. The absorption chiller-heater according to claim 1, comprising:
a charging unit that additionally charges a mixture of all of the molybdate, the sodium sulfite or the sodium bisulfite, and the octyldimethylethylammonium salt or the lauryldimethylethylammonium salt.

3. A replenishing liquid for an absorption chiller-heater for an absorption liquid used in an absorption chiller-heater, wherein all of:
2.0% to 5.2% of a molybdate as a corrosion inhibitor,
6.3% to 23% of sodium sulfite or sodium bisulfate as a concentration improving agent, and
1.0% to 12% of an octyldimethylethylammonium salt or a lauryldimethylethylammonium salt as a dispersant
are mixed to produce the replenishing liquid.

4. An absorption liquid for an absorption chiller-heater used in the absorption chiller-heater, wherein all of:
200 ppm to 520 ppm of a molybdate as a corrosion inhibitor,
630 ppm to 2300 ppm of sodium sulfite or sodium bisulfite as a concentration improving agent, and
100 ppm to 1200 ppm of an octyldimethylethylammonium salt or a lauryldimethylethylammonium salt as a dispersant
are mixed in a lithium bromide aqueous solution.

5. A maintenance method of an absorption chiller-heater including a regenerator, a condenser, an evaporator, an absorber, and a heat exchanger, in which water is used as a refrigerant and a lithium bromide aqueous solution is used as an absorption liquid, comprising:
a step of charging a replenishing liquid, which is a mixture of all of: 2.0% to 5.2% of a molybdate as a corrosion inhibitor, 6.3% to 23% of sodium sulfite or sodium disulfite as a concentration improving agent, and 1.0% to 12% of an octyldimethylethylammonium salt or a lauryldimethylethylammonium salt as a dispersant from a charging unit provided in the absorber.

6. The maintenance method of an absorption chiller-heater according to claim 5, wherein
the charging of the replenishing liquid is performed during operation of the absorption chiller-heater.

* * * * *